C. A. DAVIS.
STEERING MECHANISM.
APPLICATION FILED DEC. 4, 1920.

1,410,381. Patented Mar. 21, 1922.
3 SHEETS—SHEET 1.

Charles A. Davis,
INVENTOR

BY Victor J. Evans
ATTORNEY

WITNESS:
G. F. Baker.

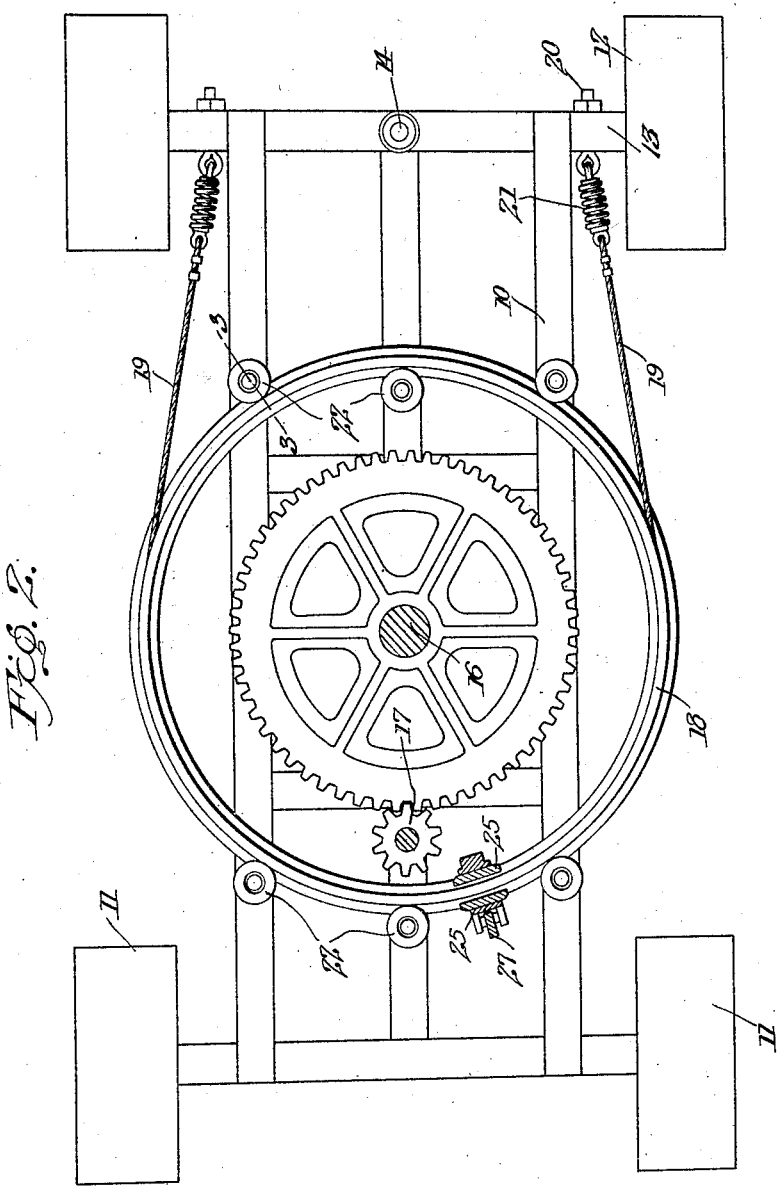

C. A. DAVIS.
STEERING MECHANISM.
APPLICATION FILED DEC. 4, 1920.
1,410,381.
Patented Mar. 21, 1922.
3 SHEETS—SHEET 3.
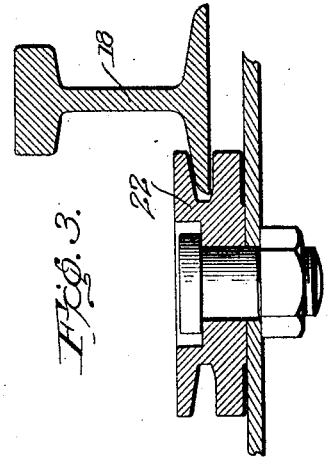
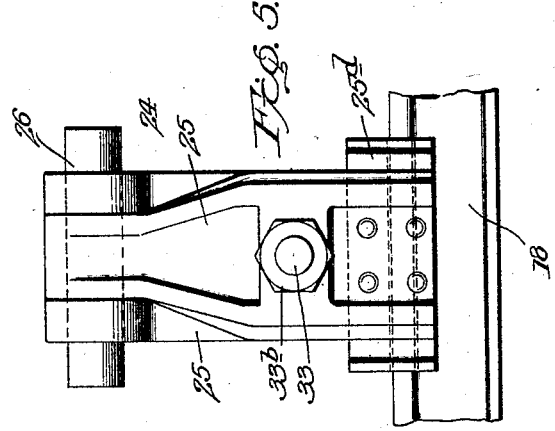
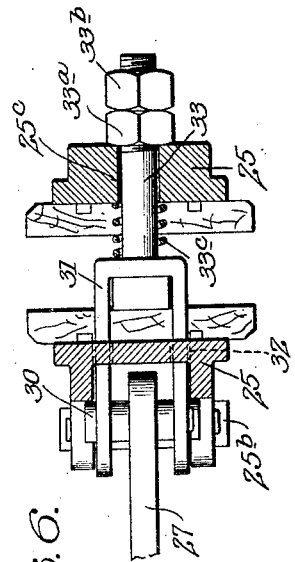
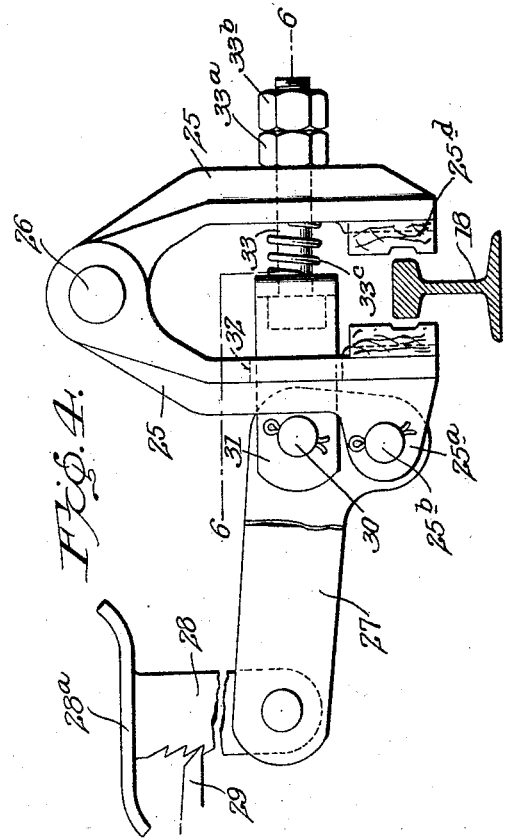
Charles A. Davis,
INVENTOR
BY Victor J. Evans
ATTORNEY
WITNESS:

UNITED STATES PATENT OFFICE.

CHARLES A. DAVIS, OF HAMMOND, INDIANA.

STEERING MECHANISM.

1,410,381.   Specification of Letters Patent.   Patented Mar. 21, 1922.

Application filed December 4, 1920. Serial No. 428,312.

*To all whom it may concern:*

Be it known that I, CHARLES A. DAVIS, a citizen of the United States, residing at Hammond, in the county of Lake and State of Indiana, have invented new and useful Improvements in Steering Mechanism, of which the following is a specification.

This invention relates to improvements in road machines, such as cranes or other machines having a turn table.

An object of the present invention is the provision of an improved steering mechanism for machines of the above character, whereby the latter may be steered irrespective of the position of the turn table or body of the machine which may be supported thereon.

For the above purpose, the invention also includes means for connecting the steering axle and turn table, such connection being effected from the interior of the machine body and at any position of the turn table.

Other objects and advantages of the invention will appear as the following description is read in connection with the accompanying drawings.

In the drawings;—

Figure 2 is a section on the line 2—2 of Figure 1.

Figure 3 is an enlarged fragmentary sectional view on the line 3—3 of Figure 2.

Figure 4 is an enlarged fragmentary section showing the mechanism for gripping the rotatable member or annulus.

Figure 5 is an end view of the same.

Figure 6 is a sectional view on the line 6—6 of Figure 4.

Referring to the drawings in detail, wherein like characters of reference denote corresponding parts, the invention, for purposes of illustration is shown as applied to a crane, although it is obvious that it may be applied to various other kinds of machines having turn tables.

Figure 1:
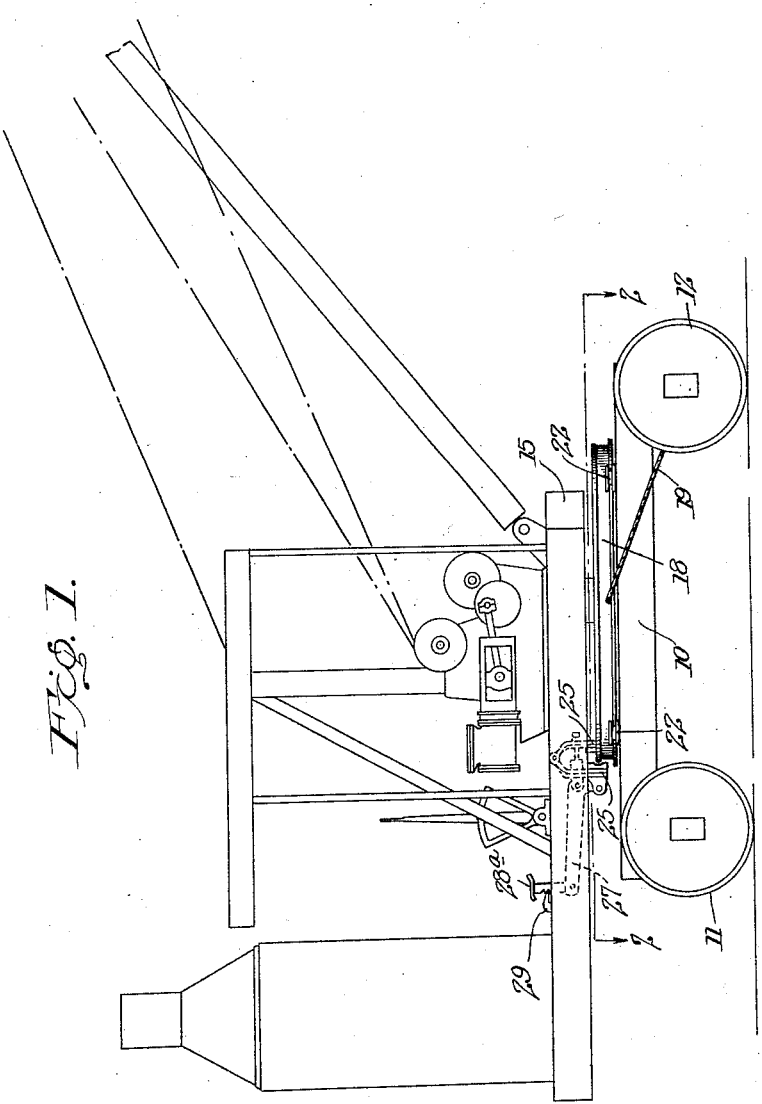
Figure 1 is a side elevation of a road crane with the invention applied thereto, the boom of the crane being broken away.

The crane shown includes a frame 10 which is mounted upon rear drive wheels 11 and front steering wheels 12, the latter being carried by a steering axle 13 which is connected to the frame 10 by a king pin 14. The frame 10 supports a turn table 15, which rotates upon a bolt 16 and which is operated by a mechanism which includes gearing 17, operated by the crane engine in the usual or any preferred manner.

Mounted upon the frame 10 is a rotatable member herein shown in the form of an annulus 18. This annulus is preferably formed of a suitable length of T-rail, such as is commonly used for railroad tracks. Secured to the annulus 18 at diametrically opposite points are flexible members in the form of cables 19, the latter being also connected to the steering axle 13 through the medium of adjustable eye bolts 20 and springs 21.

The annulus 18 is rotatably held upon the frame 10 by means of rollers 22, which are fulcrumed upon the frame and are grooved to receive the base flanges of the rail of which the annulus is formed.

For the purpose of locking the turn table 15 to the annulus 18, so that the crane may be steered by the operation of the said turn table, the latter carries a clamp 24, which is in the form of jaws 25, which are pivotally connected at one end and journaled in the turntable as at 26. Pivotally secured between ears $25^a$ upon a pin $25^b$, is one end of a substantially L-shaped operating lever 27, the opposite end of this lever being pivotally connected to the lower end of a toothed bar 28, which is provided with a foot pedal $28^a$ so as to provide means by which the bar 27 may be depressed for the purpose of operating the clamp 24, as will be hereinafter apparent. The bar 28 may be held in depressed position by means of a dog 29. Mounted upon a pivot pin 30 which is carried by the L-shaped lever 27, are the ends of a yoke 31. This yoke has its arms slidable through openings 32 provided in one of the clamping jaws 25, so that the closed end of the yoke is positioned between said jaws. Extending through an opening in the closed end of the yoke is a headed bolt 33, the head of which is positioned within the yoke, while the shank of this bolt extends through an opening $25^c$ in the other jaw 25 and has threadedly mounted thereon an adjusting nut $33^a$ and a lock nut $33^b$. A spring $33^c$ surrounds the shank of the bolt 33, being positioned between the yoke 31 and the face of one of the jaws 25.

The spring $33^c$ serves to normally keep the jaws separated, the adjusting nut $33^a$ providing means for regulating the degree of separation. By depressing the outer end of the L-shaped lever 27, through the medium of the foot pedal 28ª, the bolt 33 will, through its connection with the yoke 31 and the lever 27, draw one of the jaws inward, while the downward movement of the free end of the lever 27 will cause the opposite end of the said lever to exert an inward thrust upon the other clamping jaw, so that the said jaws are moved inwardly toward one another for clamping engagement with the annulus 18. If desired, the jaws 25 may be fitted with friction blocks 25ᵈ.

The invention is susceptible of various changes in its form, proportions and minor details of construction and the right is herein reserved to make such changes as properly fall within the scope of the appended claim.

Having described the invention what is claimed is:—

The combination with a wheel supported frame including a steering axle, a turn table mounted upon the frame and means for rotating the turn table, of an annular member mounted upon the frame, said member including interior and exterior base flanges, grooved rollers mounted upon the frame and receiving said flanges, whereby said member may be freely rotated, means connecting said member with the steering axle and means carried by the turn table for detachable connection with the rotatably mounted member, whereby motion may be imparted to the latter to operate the steering axle.

In testimony whereof I affix my signature.

CHARLES A. DAVIS.